(12) United States Patent
Racine

(10) Patent No.: US 11,267,217 B2
(45) Date of Patent: Mar. 8, 2022

(54) SYSTEM AND METHOD FOR BENDING A HOLLOW CORE SHEET USING RODS

(71) Applicant: Marc-Andre Racine, Fort McMurray (CA)

(72) Inventor: Marc-Andre Racine, Fort McMurray (CA)

( * ) Notice: Subject to any disclaimer, the term of this patent is extended or adjusted under 35 U.S.C. 154(b) by 0 days.

(21) Appl. No.: 16/822,014

(22) Filed: Mar. 18, 2020

(65) Prior Publication Data

US 2020/0215783 A1 Jul. 9, 2020

Related U.S. Application Data

(63) Continuation-in-part of application No. 15/243,997, filed on Aug. 23, 2016, now abandoned.

(51) Int. Cl.
*B32B 3/12* (2006.01)
*B29C 53/04* (2006.01)
*B29K 23/00* (2006.01)

(52) U.S. Cl.
CPC ........... *B32B 3/12* (2013.01); *B29C 53/04* (2013.01); *B29K 2023/06* (2013.01); *B29K 2023/12* (2013.01); *B32B 2307/732* (2013.01)

(58) Field of Classification Search
CPC ....... B32B 3/12; B32B 2307/732; B32B 1/00; B29C 53/04; B29K 2023/12; B29K 2023/06; B29K 2995/0094; B29K 2305/00; B29L 2024/003; B29L 2024/006
See application file for complete search history.

(56) References Cited

U.S. PATENT DOCUMENTS

| | | | |
|---|---|---|---|
| 952,074 A | 3/1910 | Ferres | |
| 1,083,271 A | 1/1914 | Brock | |
| 1,192,890 A | 8/1916 | Gulick | |
| 1,527,021 A | 2/1925 | Wandel | |
| 1,762,112 A * | 6/1930 | White | E04C 3/09 52/694 |
| 1,866,583 A * | 7/1932 | Spencer | E04C 3/08 52/694 |
| 1,914,845 A | 6/1933 | Cook | |
| 2,044,322 A * | 6/1936 | Oliver | B21D 9/08 72/369 |
| 2,396,438 A * | 3/1946 | Schaffer | 428/188 |
| 2,618,960 A * | 11/1952 | Orzel | E04C 2/06 52/576 |
| 2,779,279 A * | 1/1957 | Maiwurm | F16B 7/00 89/1.14 |
| 2,878,038 A * | 3/1959 | Noland | B29C 53/821 285/55 |
| 2,939,206 A * | 6/1960 | Keller | B21D 47/04 29/897.31 |
| 2,996,101 A * | 8/1961 | Gill | B21D 9/01 72/478 |

(Continued)

*Primary Examiner* — Kevin R Kruer
(74) *Attorney, Agent, or Firm* — Christopher Pilling

(57) ABSTRACT

A hollow core sheet having a plurality of channels and at least one bendable reinforcement rod adapted in width and thickness to a given channel dimensions for insertion inside a channel wherein the method of insertion consists in the steps of having the at least one bendable reinforcement rod having either or both of the width or the thickness having an outer dimension (OD) set between 0.50 0.75 of the given dimension of the channel with a variation of 5%.

1 Claim, 5 Drawing Sheets

(56) References Cited

U.S. PATENT DOCUMENTS

| | | | | |
|---|---|---|---|---|
| 3,060,561 A * | 10/1962 | Watter | B21D 5/00 | 29/423 |
| 3,095,613 A * | 7/1963 | Christensen | B29C 45/2614 | 249/145 |
| 3,108,696 A | 10/1963 | Winner | | |
| 3,129,493 A * | 4/1964 | Grubb | E04C 3/09 | 29/897.31 |
| 3,344,571 A * | 10/1967 | Day, Jr. | E04C 2/40 | 52/376 |
| 3,411,689 A | 11/1968 | Brackett | | |
| 3,427,706 A * | 2/1969 | Jaffee | B21D 47/00 | 228/118 |
| 3,596,419 A * | 8/1971 | Jalbert | E04H 13/00 | 52/137 |
| 3,641,230 A * | 2/1972 | Jenks | B32B 5/26 | 264/152 |
| 3,674,620 A | 7/1972 | McCarthy et al. | | |
| 3,753,635 A * | 8/1973 | Barnett | B29C 53/083 | 425/162 |
| 3,827,117 A * | 8/1974 | Oilman | B23P 17/00 | 29/897.31 |
| 3,884,612 A * | 5/1975 | Parmann | B29B 13/024 | 425/384 |
| 3,934,450 A * | 1/1976 | Reed | B21D 7/06 | 72/383 |
| 3,961,738 A * | 6/1976 | Ollman | B21D 47/04 | 228/5.1 |
| 4,158,586 A * | 6/1979 | Usui | B29C 33/485 | 138/125 |
| 4,160,006 A * | 7/1979 | Patzner | B29C 53/82 | 264/292 |
| 4,203,790 A | 5/1980 | Chavannes | | |
| 4,228,209 A | 10/1980 | Chavannes | | |
| 4,341,579 A | 7/1982 | Chavannes | | |
| 4,441,527 A * | 4/1984 | Tolliver | B21F 27/121 | 138/175 |
| 4,525,964 A * | 7/1985 | Diethelm | E04C 2/22 | 52/309.11 |
| 4,620,401 A * | 11/1986 | L'Esperance | B29C 70/205 | 52/309.15 |
| 4,916,027 A * | 4/1990 | DelMundo | B32B 15/01 | 428/586 |
| 5,518,575 A * | 5/1996 | Watanabe | B29C 31/002 | 156/494 |
| 5,562,875 A * | 10/1996 | Miller | B29C 48/335 | 264/177.16 |
| 5,597,185 A * | 1/1997 | Bray | B29C 53/083 | 264/285 |
| 5,658,644 A * | 8/1997 | Ho | B29C 48/30 | 428/188 |
| 5,765,285 A * | 6/1998 | Buy | B29C 53/083 | 138/140 |
| 5,868,373 A | 2/1999 | Duff | | |
| 5,998,028 A | 12/1999 | Eckart et al. | | |
| 6,298,622 B1 * | 10/2001 | Cretti | B29C 45/14311 | 52/309.12 |
| 6,540,500 B2 * | 4/2003 | Pery-Johnston | B29C 53/083 | 264/339 |
| 6,619,669 B2 * | 9/2003 | Zhuo | F16J 15/3284 | 277/654 |
| 6,638,291 B1 * | 10/2003 | Ferrera | A61B 17/12022 | 606/191 |
| 6,792,732 B2 * | 9/2004 | Strassle | A47B 47/0016 | 403/171 |
| 6,803,083 B2 * | 10/2004 | Ensinger | E06B 3/26301 | 428/188 |
| 7,115,317 B2 * | 10/2006 | Zhuo | B32B 5/26 | 428/174 |
| 7,353,641 B2 * | 4/2008 | Yoshii | B28B 7/28 | 52/577 |
| 8,187,516 B2 * | 5/2012 | Jungert | B29C 70/086 | 264/295 |
| 9,003,723 B2 * | 4/2015 | Ueki | E04C 5/012 | 52/167.3 |
| 9,156,599 B2 * | 10/2015 | Gustavsson | B65D 81/00 | |
| 9,327,564 B2 * | 5/2016 | Breeden | B60D 1/52 | |
| 9,435,060 B2 * | 9/2016 | Woods | B29C 53/58 | |
| 2001/0045689 A1 * | 11/2001 | Pery-Johnston | B29C 53/083 | 264/339 |
| 2002/0053179 A1 * | 5/2002 | Wycech | B62D 29/002 | 52/834 |
| 2002/0106468 A1 * | 8/2002 | Obeshaw | B29D 99/0035 | 428/36.9 |
| 2005/0074582 A1 * | 4/2005 | Zhuo | B32B 5/26 | 428/166 |
| 2006/0016078 A1 * | 1/2006 | Bladow | B21D 53/88 | 29/897.312 |
| 2006/0265874 A1 * | 11/2006 | Hashimoto | B21C 37/22 | 29/890.049 |
| 2007/0090162 A1 * | 4/2007 | Verhaeghe | B29C 70/24 | 228/101 |
| 2007/0184144 A1 * | 8/2007 | Akishev | B29C 53/24 | 425/403 |
| 2007/0246117 A1 * | 10/2007 | Naganawa | F16L 9/18 | 138/108 |
| 2008/0014388 A1 * | 1/2008 | Mett | B29C 45/14631 | 428/34.1 |
| 2008/0233347 A1 * | 9/2008 | Chefdeville | B29C 70/42 | 428/116 |
| 2008/0236057 A1 * | 10/2008 | McCarty | E04B 7/105 | 52/80.1 |
| 2008/0296164 A1 * | 12/2008 | Dajek | B62D 29/004 | 205/80 |
| 2009/0044394 A1 * | 2/2009 | Brosske | B21C 37/0815 | 29/421.1 |
| 2009/0084059 A1 * | 4/2009 | Moreno | E04C 3/20 | 52/649.2 |
| 2009/0119961 A1 | 5/2009 | Harms | | |
| 2011/0020595 A1 * | 1/2011 | Kolax | B32B 5/024 | 428/116 |
| 2011/0036052 A1 * | 2/2011 | Callahan | E04C 3/07 | 52/843 |
| 2011/0185664 A1 * | 8/2011 | Lee | E04C 2/044 | 52/309.16 |
| 2012/0260709 A1 * | 10/2012 | Krajewski | B21D 22/025 | 72/57 |
| 2012/0325363 A1 * | 12/2012 | Knebl | B29C 53/84 | 138/177 |
| 2013/0061646 A1 * | 3/2013 | Cernuschi | B21B 25/02 | 72/209 |
| 2013/0291477 A1 * | 11/2013 | Jobin | E04C 3/02 | 52/653.2 |
| 2014/0000337 A1 * | 1/2014 | Carlo | B29C 53/083 | 72/466.2 |
| 2014/0130657 A1 * | 5/2014 | Pilpel | B32B 5/12 | 89/36.02 |
| 2015/0107754 A1 * | 4/2015 | Verhaeghe | B29C 70/24 | 156/93 |
| 2016/0176495 A1 * | 6/2016 | Stewart | B29D 99/0003 | 428/152 |
| 2016/0256909 A1 * | 9/2016 | Kawamoto | B21B 25/00 | |
| 2016/0316997 A1 * | 11/2016 | Viebach | F16C 1/10 | |
| 2016/0325330 A1 * | 11/2016 | Nitta | B21D 35/006 | |
| 2017/0057149 A1 * | 3/2017 | Eichenhofer | B29C 66/72141 | |
| 2017/0080630 A1 * | 3/2017 | Racine | B29C 53/24 | |
| 2017/0198837 A1 * | 7/2017 | Wako | F16L 9/19 | |
| 2018/0056359 A1 * | 3/2018 | Koechig | B21F 1/006 | |
| 2020/0215783 A1 | 7/2020 | Racine | | |

* cited by examiner

SYSTEM AND METHOD FOR BENDING A HOLLOW CORE SHEET USING RODS

CROSS-REFERENCE TO RELATED APPLICATIONS

The present application is a Continuation In Part claiming priority on pending applications 20170080630 filed on Aug. 23, 2016 entitled "System and method for bending a hollow core sheet using rods", the disclosure of which is hereby incorporated in its entirety at least by reference.

BACKGROUND OF THE INVENTION

1. Field of the Invention

The present invention relates generally to hollow core corrugated sheets made of plastic such as polypropylene (PP) or polyethylene (PE), but more particularly to a system and method of reinforcing those sheets so that rigid shapes and angles can be imparted to them so as to make various products thereof.

2. Description of Related Art

Hollow core sheets, also known as corrugated sheets have a hollow space between two bonded panels kept spaced apart by way of a plurality of ribs made out of the same material. The manufacturing process is generally by way of extrusion and the ribs create a plurality of co-joined channels which are hollow. So, the sheet, in volume, is made mostly of hollow space, hence the name "hollow core sheet". The thickness of the sheet, do to its hollow core, gives it strength, and the plastic gives it a long life. The channels can be triangular shaped like sine waves, such as commonly seen in corrugated carton boxes. In some instances, some cardboard or plastic corrugated materials have only one sheet bonded to a sine wave corrugated sheet. See FIG. 5 for examples.

Hollow core sheets are used for making a wide range of products from packaging, advertising signage, stationery, shock resistant boxes etc. At the moment, hollow core sheets have limitations on their applications due to the limitations of their strength and malleability. There hence exists a need for strengthening hollow core sheets in order to expand their applications. In order to understand the specification, one has to know what hollow core plastic sheets are. FIG. 1 is an example of what such sheets look like.

The original hollow core sheets were actually patterned after corrugated cardboard such as the type used for making corrugated cardboard boxes. But it was soon found that making corrugated plastic sheets the same way corrugated cardboard is made does not make full use of the properties of plastic. Making hollow core plastic sheets from an extrusion process improved the properties of hollow core sheets by making well defined channels. Hollow core sheet generally measure 4 ft by 8 ft and have thicknesses ranging from 1/16" up to 1/2". Channels can be square or rectangular or have other shapes as disclosed in the specification. Other sizes are of course possible. Also, those sheets come in many colors and can be transparent or translucent.

A common use of hollow core sheets is in Real Estate signs or election banners put in front lawns.

Some creative people thought that furniture and various household objects could be made from that material.

In order to add strength to some of those objects, some people thought of adding steel rods to make yard sign stakes. There exists different sizes of such rods, depending on the width of the hollow core sheet but the main intention of using rod inside the channel of the hollow core sheet for a yard sign, or other uses of hollow core sheets, is to have the rod be equal or larger in size than the channel it occupies so as to hold the hollow core sheet and the rod together and add additional structural strength to the hollow core sheet. This maximum use of space by the rod causes the plastic to stretch, sometimes to the maximum elongation it can take before failure.

It is easy to understand that for some application, inserting one or more metal rod inside the channels of a hollow core sheet is for reinforcing the structure of the hollow core sheet, but doing so comes with some drawbacks such as how to prevent the metal rod from slipping or sliding inside the channel, how to calculate the exact length of the rod so that it does not stick out from the ends of the plastic sheet, etc. There is therefore need for improvement in that field.

BRIEF SUMMARY OF THE INVENTION

In view of the foregoing disadvantages inherent in the known devices now present in the prior art, the present invention, which will be described subsequently in greater detail, is to provide objects and advantages which are:

To provide for a means of reinforcing hollow core sheets so as to give the possibility of producing designated shape applications.

It is another advantage of this invention to provide a reinforcement to the hollow core sheet which eliminates the use of a separate application of adhesive material.

It is yet another advantage of this invention to reinforce the hollow core sheet without subjecting it to heat damage.

Still another advantage is to provide a low cost process for manufacturing reinforced hollow core sheets manually or mechanically.

In order to do so, the invention comprises a hollow core sheet having a plurality of channels and at least one bendable reinforcement rod adapted in width and thickness to a given channel dimensions for insertion inside a channel. The method of insertion consists in the steps of having the at least one bendable reinforcement rod having either or both of the width or the thickness having an outer dimension (OD) set approximately between 0.50 and 0.75 of the inner dimensions of the channel with a variation of + or −5%.

In a preferred embodiment, the length of the bendable reinforcement rod to be bent is directly proportional to the thickness of the sheet and the number of bends required for a particular shape and is calculated using the formula $T \times 0.5 \times Nb = rrL$ wherein "T" is the thickness of the sheet and "Nb" is the number of bends and "rrL" is the reduced rod length.

In a preferred embodiment there is a minimum bend angle to stabilize the bendable reinforcement rod inside the channel wherein the minimum bend angle is calculated using the formula $hyp = L/2$, followed by $OP = IW - OD$ where the opposite side in a right-angle triangle is OP, the interior width of the channel is IW and the outside dimension of the rod is OD, and the angle in deis given by $\sin x = OP/Hyp$ and x is then multiplied by 2.

In yet another preferred embodiment, the reinforcement rod made out of metal.

Still in another embodiment, more than one bendable reinforcement rod can be inserted into a given channel.

Still in another embodiment, the bendable reinforcement rod is pushed inside a channel so that each of its ends is of an equal distance inside the channel.

The system can be implemented by following steps which include: having at least one rod that is bent to a minimum angle in relation to its length and its relative size ratio to the thickness of the hollow core sheet, and then is inserted into a channel forming part of a hollow core sheet so as to prevent sliding within the channel; said at least one rod being calculated as having a maximum width set between 50 to 75% (+ or −5%) of the internal width of the channel it is inserted in when making a bend.

The foregoing and other objects, features, and advantages of this invention will become more readily apparent from the following detailed descriptions of a preferred embodiment of the innovation with reference to the accompanying drawings as is shown and described, by way of examples. As will be realized, the invention is capable of other and different use, and its details can be modified in various ways, all without departing from the invention. For example, the invention can come in varying sizes and shapes with variations in the material of the bendable rod used, sizes, design and assembly of components. Accordingly, the drawings and description are to be regarded as illustrative in nature, and not as restrictive.

BRIEF DESCRIPTION OF THE SEVERAL VIEWS OF THE DRAWINGS

Other features and advantages of the present invention will become apparent when the following detailed description is read in conjunction with the accompanying drawings, in which.

DETAILED DESCRIPTION OF THE PREFERRED EMBODIMENT

Figure 1:
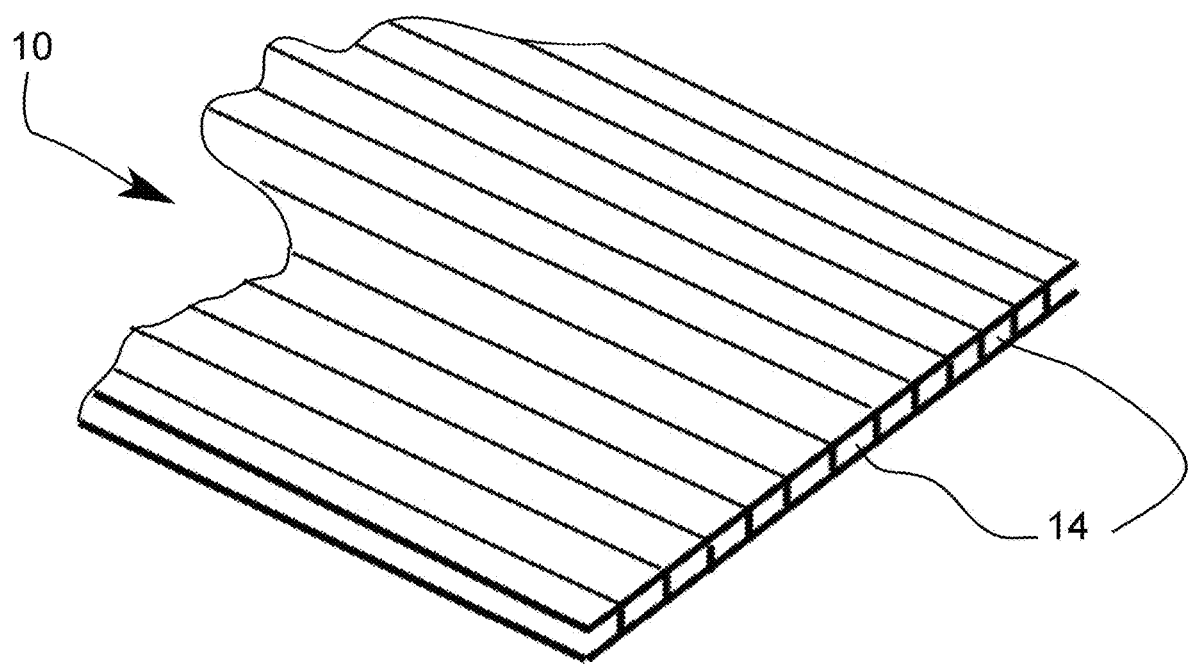
FIG. 1 is an isometric view of an example of a hollow core sheet, according to an embodiment of the present invention.
Figure 2:
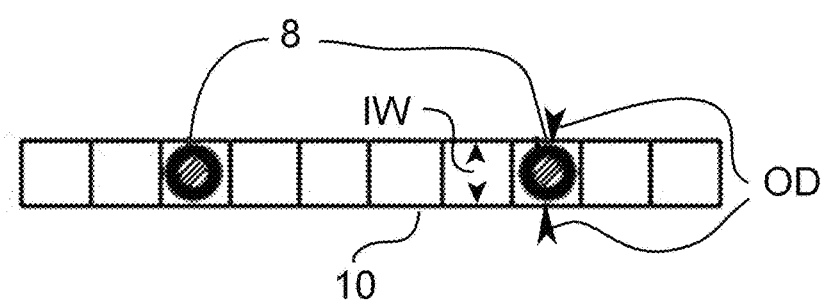
FIG. 2 is an end view of a hollow core sheet with rods of the prior art.
Figure 3:
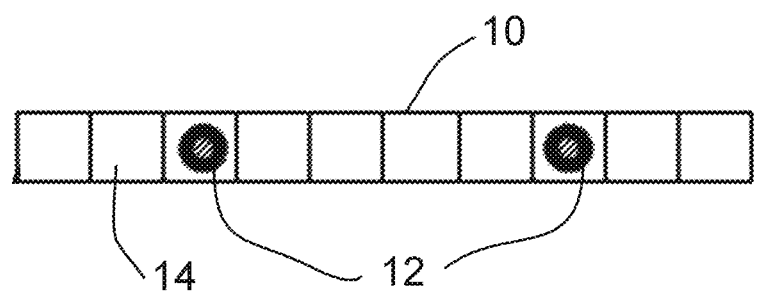
FIG. 3 is an end view of a hollow core sheet with 75% rods
Figure 4:
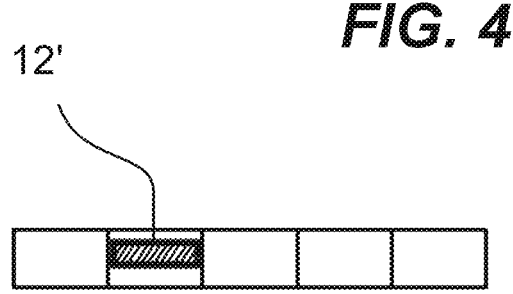
FIG. 4 is an end view of a hollow core sheet with a flat rod (12') set at 50% of the thickness of the hollow core sheet.

The following description is provided to enable any person skilled in the art to make and use the invention and sets forth the best modes contemplated by the inventor of carrying out his invention. Various modifications, however, will remain readily apparent to those skilled in the art, since the general principles of the present invention have been defined herein.

A hollow core sheet (10) having a bendable reinforcement rod (12) inserted inside a channel (14) forming part of the hollow core sheet (10). The reinforcement rod (12) is generally made out of metal for durability and bendability but any material exhibiting the same characteristics can be used. A given hollow core sheet (10) can of course have more than one rod (12). Rods (12) can be bent into many shapes and can be of any of a variety of sizes to suit the needs of the object created. More than one rod (12) can be inserted, depending upon the desired shape and size the final object happens to be. In some cases, more than one rod (12) can be inserted into a given channel. Of course, depending upon the dimensions of the channels, the rods (12) are adapted in width and thickness for the best fit. When an object requires strength, the number of rods (12) inserted inside the channels (14) can be increased to provide for a higher rod (12) density.

In a preferred embodiment, the rods (12) are round, e.g. They have a diameter instead of a width or height. In such case, the inserted rods (12) have a maximum outside diameter (OD) of 75% of the internal width (IW) of the channel (14) so that the rod (12) is not forced into the channel in such a way a to deform or even break the walls of the channel (14), which could weaken the board when curves or folds are made to create a desired shape. The prior art, as shown in FIG. 1 uses full size rods (8) which means a full 100% OD sized rod which fills the entire IW of the channel (14). There is no concern for bending issues since the purpose is not to bend the panel but rather to give it stiffness. Used as is, bending the rod (8) would result in damaging the channel (14) where the rod(s) is(are) located. The need for a 75% OD will be further discussed later.

Another factor to consider is how deep the rod (12) has to be inserted inside a channel (14), that is deeper than the edge of the channel (14), so that it does not stick out after a bend is made in the rod (12). To better understand this factor, let's take the example of a pair of pants: Everyone who has worn pants knows than when one sits down, the pants seem to have either gone shorter or the legs somehow magically got longer. In fact, none of that has happened, what really happened is that bending the knees makes the part of the pant legs behind the knees to fold behind the knees while at the same time stretching the part of the pant set in front of the knees. Since some of the cloth is stuck behind the knees, the front cloth cannot stretch as needed, which results in the pant legs creeping up. A similar phenomenon happens when bending the hollow core sheet (10). The interior side of the bend compresses while the exterior side of the bend stretches which results in the apparent shortening of the sheet (10) which makes the rod (12) stick out, unless one inserts the rod (12) slightly deeper inside the channel (14) so that when it creeps out, it is still inside the channel (14) instead of jutting out of the sheet (10). Since this phenomenon repeats for each bend, one only has to know how many bends the final piece and by how much each bend apparently lengthen the rod (or shorten the sheet) to measure and cut the rod (12) accordingly.

The inventive matter are thus the formulas to be used in order to do the proper calculations. How shorter the rod (12) needs to be is calculated relative to the size of the rod (12) that is inserted within the channel (14), which is directly proportional to the thickness of the sheet (10) and the number of bends required for a particular shape.

For example: Nb=Number of bends and T=Thickness of the sheet (10).

When many bends are needed to obtain a desired form, it is important to multiply the thickness (T) of the sheet (10) by number of bends (Nb) by 0.5 to obtain the reduced rod length (rrL). The formula is thus:

$$T \times 0.5 \times Nb = rrL$$

So, for a sheet that is 4 mm thick where 3 bends are required, the formula would be:

$$4\ mm \times 0.5 \times 3 = 6\ mm$$

For a sheet (10) that is 100 mm long, the rod (12) would need to be 100 mm−6 mm (rrL)=94 mm long That 6 mm short should be split evenly between both ends of the channel (14).

To help stabilize the rod (12) inside the channel (14), especially when there is no bend required and without over stretching the hollow core sheet, a minimum bend angle (20) is needed to secure the rod (12) inside the channel (14). What this means is that given that it is recommended to use rods (12) having an OD that is 75% of the IW of the channel (14), one can clearly understand that there might be an issue with a loose fitting rod sliding out of the channel (14). In order to prevent that, a "kink", otherwise known as the minimum bend angle (20) is given to the rod (12) so as to prevent sliding out of the rod (12) from the channel (14).

Figure 6A:
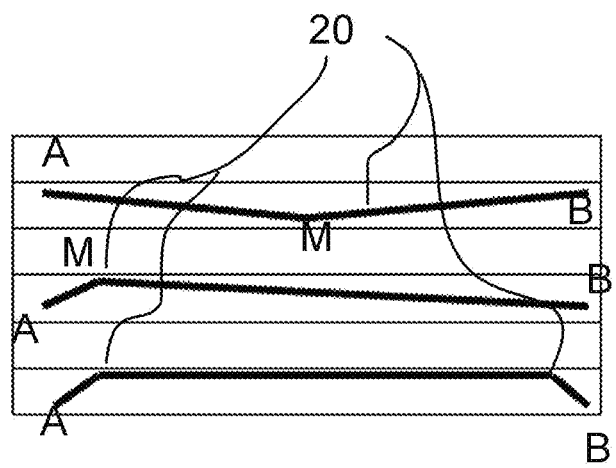
FIGS. 6A-B are top and side see through schematic views showing various types of bend angles.
Figure 6B:
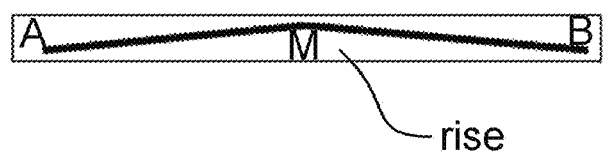
Figure 7A:
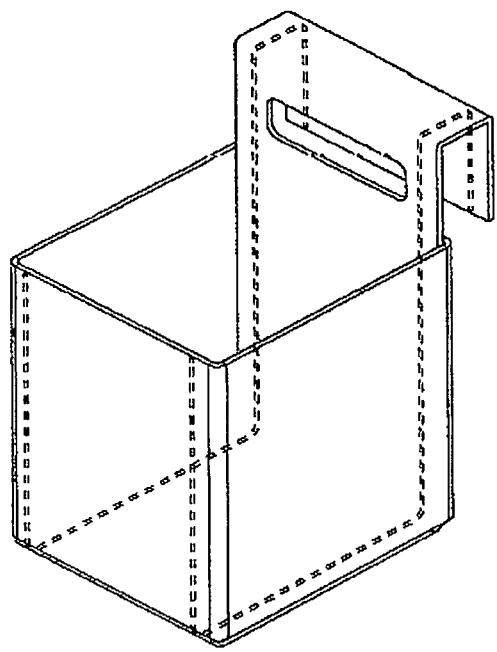
FIGS. 7A-B are isometric views showing an object having multiple bends.
Figure 7B:
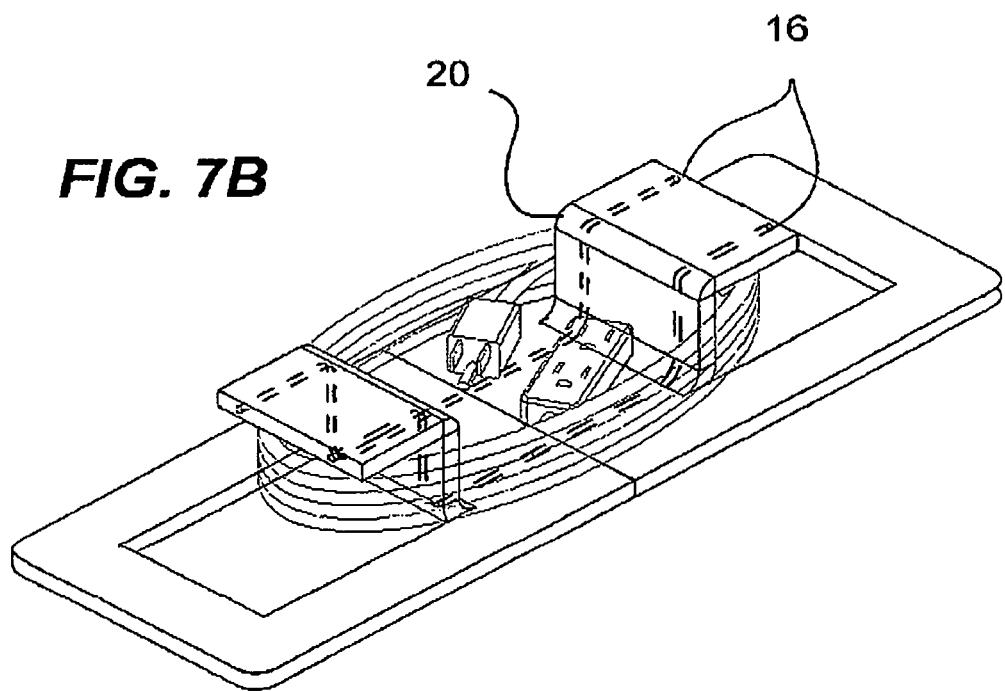

For clarity, the minimum bend angle (20) has been exaggerated in FIG. 6A. Also, the figure shows the bend is made across the width of the sheet (10) but it could also be made across the thickness of the sheet (10) as per FIG. 6B. If we consider that a flat rod (12) is in fact a rod (12) having a 180 degree angle, by making an arc from point A to point B in FIGS. 6A-B, The angle of the rod (12) would be slightly less than 180 degrees. In other words, the rod (12) is not flat but rather has a small bend that creates friction against the walls of the channel (14) so that the rod (12) is prevented from sliding out.

How much of a bend is to be imparted on the rod (12) depends upon the length of the rod (12). Here is what that means: Looking at FIG. 6B, if the rod (12) is 3 mm in thickness and the channel (14) is 4 mm high. The rod (12) only requires a 1 mm rise to create friction at point "M". But if the rod (12) is 1 mm thick and the channel (14) is still 4 mm, the rod (12) needs a 3 mm rise to create contact at point "M". If in both cases the rod (12) has the same length, the degree of bend has to be higher in the 1 mm than the 3 mm rod (12). So, when the rod (12) has a given thickness and a given length and is inserted in the channel (14) which has a given height, the rod (12) requires at least an angle of x degree in bend in order for it to make frictional contact with the interior side of the channel (14) and prevent it from sliding out. Since there is a minimum degree angle in order to achieve that, we conveniently call that the minimum bend angle (20) and make it as a rule that whenever using rods (12) having a given thickness and length that is inserted in a channel (14) of a given dimension (height or width depending on the orientation of the bend within the channel (14)), we have a specific minimum bend angle (20).

For example, if the rod (12) is 3 mm thick by 1,000 mm long and the channel (14) is 4 mm in height, applying the formula we can get the minimum bend angle (20) of x degrees.

Figure 8:
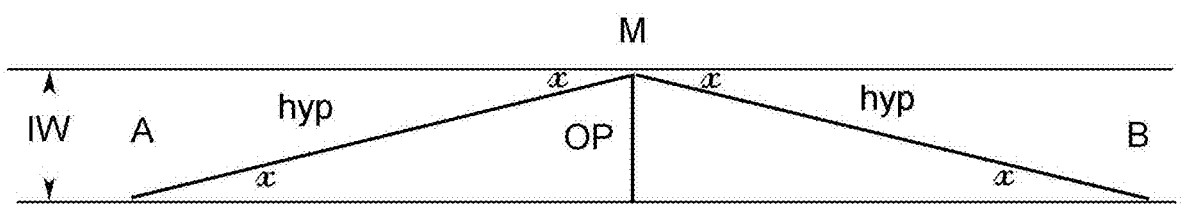
FIG. 8 is a schematic view to show the trigonometric calculations to determine the minimum bend angle to stabilize a rod inside a channel.

The way it is calculated goes like this:

FIG. 8 shows a bent rod (12) represented by two right-angle triangles co-joined at their trigonometrically defined opposite sides. The angles "x" are identical and we know the length of both hypotenuse and the length of the opposite sides. Given that the length "L" of the rod (12) is 1,000 mm, that means that from A to M the length is 500 mm, and the same for M to B.

So we do hyp=L/2 to get the 500 mm

Then we need to know how much of a rise we need. The IW of the channel (14) is 4 mm and the OD of the rod (12) is 3 mm.

Thus we have rise, which is defined by the "opposite side"" or OP:

OP=IW−OD

Because the channel has an IW of 4 mm and the rod has an OD of 3 mm, we have 4 mm−3 mm=1 mm (OP).

Now having the measurements for the hypotenuse (hyp) and the rise (OP) we can obtain the minimum required angle x by applying the trigonometric function of sinus of opposite side over hypotenuse (Sin x=OP/Hyp)

Sin x=1/500 x=−Sin×1/500

Which gives 0.012 degree for the minimum required angle, rounded up from 0.1145.

In FIG. 8 all "x" are the same angle so in order to properly bend the rod, it would in fact be 2×0.12=0.24 degrees In order to get the appropriate bend angle. With a much shorter rod (12) length, one quickly understands that the minimum required angle is more pronounced because the OP hyp ratio is different.

The determined angle applied to the rod (12) is measured in function of length of the rod (12) and IW of channel (14).

Figure 5:
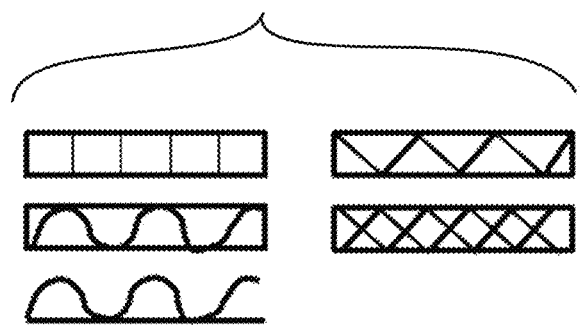
FIG. 5 is a cutaway side views of a variety of possible channel shapes.

FIG. 5 shows variations where there is more than one angle bend which results in most of the rod (12) touching one side of the channel and only points A and B touching the opposite side of the channel. Also, the "M" point does not need to be in the middle.

Although the invention has been described in considerable detail in language specific to structural features, it is to be understood that the invention defined in the appended claims is not necessarily limited to the specific features described. Rather, the specific features are disclosed as exemplary preferred forms of implementing the claimed invention. Stated otherwise, it is to be understood that the phraseology and terminology employed herein, as well as the abstract, are for the purpose of description and should not be regarded as limiting. Therefore, while exemplary illustrative embodiments of the invention have been described, numerous variations and alternative embodiments will occur to those skilled in the art. Such variations and alternate embodiments are contemplated, and can be made without departing from the spirit and scope of the invention.

It should further be noted that throughout the entire disclosure, the labels such as left, right, front, back, top, bottom, forward, reverse, clockwise, counter clockwise, up, down, or other similar terms such as upper, lower, aft, fore, vertical, horizontal, oblique, proximal, distal, parallel, perpendicular, transverse, longitudinal, etc. have been used for convenience purposes only and are not intended to imply any particular fixed direction or orientation. Instead, they are used to reflect relative locations and/or directions/orientations between various portions of an object.

In addition, reference to "first," "second," "third," and etc. members throughout the disclosure (and in particular, claims) are not used to show a serial or numerical limitation but instead are used to distinguish or identify the various members of the group.

The invention claimed is:

1. A plastic hollow core sheet comprising:
 a plurality of rectangular uniform channels having a channel length consisting of a top portion and a bottom portion, wherein the top portion and the bottom portion are parallel and the distance between the top portion and the bottom portion defining an internal width;

a circular reinforcement rod having a rod length and an outer diameter 50%-75% of the internal width, wherein the circular reinforcement rod is inserted within a channel of the plurality of rectangular uniform channels; and, the circular reinforcement rod is bent at a minimum bend angle within the channel such that the rod length is less than the channel length and the circular reinforcement rod does not conform to a shape of the channel.

\* \* \* \* \*